US012649583B1

(12) United States Patent
Clark et al.

(10) Patent No.: US 12,649,583 B1
(45) Date of Patent: Jun. 9, 2026

(54) ELECTRICAL ASSEMBLY FOR A HYBRID-ELECTRIC AIRCRAFT PROPULSION SYSTEM

(71) Applicant: RTX Corporation, Farmington, CT (US)

(72) Inventors: Thomas E. Clark, Wells, ME (US); John Akin, Charlotte, NC (US); Jung Muk Choe, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/087,127

(22) Filed: Mar. 21, 2025

(51) Int. Cl.
 *B64D 27/33* (2024.01)
 *F01D 13/00* (2006.01)

(52) U.S. Cl.
 CPC ............. *B64D 27/33* (2024.01); *F01D 13/00* (2013.01)

(58) Field of Classification Search
 CPC ...... B64D 27/33; B64D 27/026; B64D 27/02; B64D 31/18; F01D 13/00; F01D 15/00
 See application file for complete search history.

(56) References Cited

U.S. PATENT DOCUMENTS

| | | | | |
|---|---|---|---|---|
| 8,099,944 | B2 * | 1/2012 | Foster | F02C 6/14 |
| | | | | 60/788 |
| 9,045,996 | B2 * | 6/2015 | Anghel | F02C 7/36 |
| 9,266,716 | B2 * | 2/2016 | Feyh | H02J 9/061 |
| 9,328,661 | B2 | 5/2016 | Ho | |
| 9,601,970 | B2 * | 3/2017 | French | F02C 7/36 |
| 10,000,293 | B2 * | 6/2018 | Hamel | B64D 31/18 |
| 10,093,428 | B2 * | 10/2018 | Kupiszewski | H02J 1/102 |
| 10,442,547 | B2 * | 10/2019 | Miller | G05B 23/0283 |
| 10,538,337 | B2 * | 1/2020 | Vondrell | H02G 5/10 |
| 10,797,628 | B2 * | 10/2020 | French | B81B 7/02 |
| 10,800,539 | B2 * | 10/2020 | Niergarth | B64D 27/33 |
| 11,047,251 | B2 | 6/2021 | Banham | |
| 11,312,256 | B2 * | 4/2022 | Vinson | B64D 31/18 |
| 11,325,714 | B2 * | 5/2022 | Datta | B64D 27/31 |
| 11,384,696 | B2 * | 7/2022 | Turner | F02C 9/44 |
| 11,480,112 | B2 * | 10/2022 | Whatley | F02C 9/48 |
| 11,588,431 | B2 * | 2/2023 | Bachmann | B64D 31/18 |
| 11,591,987 | B2 * | 2/2023 | Frantz | H02K 7/1823 |
| 11,724,815 | B2 * | 8/2023 | Mackin | F02C 3/113 |
| | | | | 60/801 |

(Continued)

*Primary Examiner* — Courtney D Heinle
*Assistant Examiner* — Behnoush Haghighian
(74) *Attorney, Agent, or Firm* — Getz Balich LLC

(57) ABSTRACT

A hybrid-electric aircraft propulsion system includes an engine, a first electric machine assembly, and a second electric machine assembly. The engine includes a first rotational assembly and a second rotational assembly. The first electric machine assembly includes a first electric machine, a first control unit, first electrical cables, and a first cable conduit. The first electric machine is coupled with the first rotational assembly. The first electrical cables extend between and electrically connect the first electric machine and the first control unit through the first cable conduit. The second electric machine assembly includes a second electric machine, a second control unit, second electrical cables, and a second cable conduit. The second electric machine is coupled with the second rotational assembly. The second electrical cables extend between and electrically connect the second electric machine and the second control unit through the second cable conduit.

18 Claims, 3 Drawing Sheets

(56)     References Cited

U.S. PATENT DOCUMENTS

| | | | | |
|---|---|---|---|---|
| 11,725,594 | B2 * | 8/2023 | McQuiston | F02K 3/04 |
| | | | | 60/773 |
| 11,781,477 | B2 * | 10/2023 | Muldoon | B64D 27/10 |
| | | | | 60/785 |
| 12,031,479 | B2 * | 7/2024 | Hiett | B64D 31/18 |
| 12,202,615 | B2 | 1/2025 | Bruce | |
| 12,246,841 | B2 * | 3/2025 | Datta | H02K 7/1823 |
| 12,263,953 | B2 * | 4/2025 | Freer | B64D 31/18 |
| 2014/0360205 | A1 * | 12/2014 | French | F02C 9/00 |
| | | | | 290/46 |
| 2015/0274506 | A1 * | 10/2015 | Feyh | F01D 15/10 |
| | | | | 257/416 |
| 2016/0214727 | A1 * | 7/2016 | Hamel | B64D 27/18 |
| 2017/0037774 | A1 * | 2/2017 | Jones | F02B 53/04 |
| 2017/0187311 | A1 * | 6/2017 | French | B81C 1/00158 |
| 2018/0370651 | A1 * | 12/2018 | Miller | B64D 27/12 |
| 2019/0118935 | A1 * | 4/2019 | Love | B64C 11/26 |
| 2021/0408857 | A1 * | 12/2021 | Böhm | B64D 27/33 |
| 2022/0009643 | A1 * | 1/2022 | Datta | H02J 1/10 |
| 2022/0063826 | A1 * | 3/2022 | Hiett | F02C 7/262 |
| 2023/0356849 | A1 * | 11/2023 | Datta | F02C 7/32 |
| 2024/0126259 | A1 * | 4/2024 | Juhrig | G05D 1/0077 |
| 2024/0391599 | A1 * | 11/2024 | Kumar | F02C 9/56 |
| 2024/0425187 | A1 * | 12/2024 | Gharagozloo | B64D 31/10 |

* cited by examiner

ELECTRICAL ASSEMBLY FOR A HYBRID-ELECTRIC AIRCRAFT PROPULSION SYSTEM

BACKGROUND

1. Technical Field

This disclosure relates generally to hybrid-electric propulsion systems for aircraft and, more particularly, to electric machine assemblies for hybrid-electric propulsion systems.

2. Background Information

Hybrid-electric propulsion systems for aircraft include electrical equipment, such as electric machines, configured to operate with an engine to provide thrust for an associated aircraft. This electrical equipment may require complex and extensive electrical interconnections routed through the propulsion system. Various electrical equipment configurations for hybrid-electric aircraft propulsion systems are known in the art. While these known configurations may be useful for their intended purposes, there is always room in the art for improvement.

SUMMARY

According to an aspect of the present disclosure, a hybrid-electric aircraft propulsion system includes an engine, a first electric machine assembly, and a second electric machine assembly. The engine includes a first rotational assembly and a second rotational assembly. The first electric machine assembly includes a first electric machine, a first control unit, first electrical cables, and a first cable conduit. The first electric machine is coupled with the first rotational assembly. The first electrical cables extend between and electrically connect the first electric machine and the first control unit. The first electrical cables extending through the first cable conduit between the first electric machine and the first control unit. The second electric machine assembly includes a second electric machine, a second control unit, second electrical cables, and a second cable conduit. The second electric machine is coupled with the second rotational assembly. The second electrical cables extend between and electrically connect the second electric machine and the second control unit. The second electrical cables extend through the second cable conduit between the second electric machine and the second control unit.

In any of the aspects or embodiments described above and herein, the first cable conduit may extend between and to the first electric machine and the first control unit.

In any of the aspects or embodiments described above and herein, the second cable conduit may extend between and to the second electric machine and the second control unit.

In any of the aspects or embodiments described above and herein, the engine may further include an engine static structure housing the first rotational assembly and the second rotational assembly, the first electric machine and the second electric machine may be disposed within the engine static structure, and the first control unit and the second control unit may be disposed outside the engine static structure.

In any of the aspects or embodiments described above and herein, the hybrid-electric aircraft propulsion system may further include a nacelle circumscribing and housing the engine, and the first control unit and the second control unit may be disposed at the nacelle.

In any of the aspects or embodiments described above and herein, the first cable conduit may extend along the second cable conduit from the nacelle to the engine static structure.

In any of the aspects or embodiments described above and herein, the first cable conduit may include a first conduit material, the second cable conduit may include a second conduit material, and the first conduit material may be different than the second conduit material.

In any of the aspects or embodiments described above and herein, each of the first rotational assembly and the second rotational assembly may include a shaft, a bladed compressor rotor, and a bladed turbine rotor, and the shaft may interconnect the bladed compressor rotor.

According to another aspect of the present disclosure, a hybrid-electric aircraft propulsion system includes an engine and an electrical assembly. The engine includes a first rotational assembly and a second rotational assembly. The electrical assembly includes a first electric machine, first electrical cables, a first cable conduit, a second electric machine, second electrical cables, a second cable conduit, and at least one control unit. The first electric machine is coupled with the first rotational assembly. The first electrical cables extend between and electrically connect the first electric machine and the at least one control unit. The first cable conduit includes a first tubular conduit body. The first electrical cables extend through the first tubular conduit body between the first electric machine and the at least one control unit. The second electric machine is coupled with the second rotational assembly. The second electrical cables extend between and electrically connect the second electric machine and the at least one control unit. The second cable conduit includes a second tubular conduit body. The second electrical cables extend through the second tubular conduit body between the second electric machine and the at least one control unit.

In any of the aspects or embodiments described above and herein, the first tubular conduit body may extend between and to the first electric machine and the at least one control unit.

In any of the aspects or embodiments described above and herein, the second tubular conduit body may extend between and to the second electric machine and the at least one control unit.

In any of the aspects or embodiments described above and herein, the engine may further include an engine static structure housing the first rotational assembly and the second rotational assembly, the first electric machine and the second electric machine may be disposed within the engine static structure, and the at least one control unit may be disposed outside the engine static structure.

In any of the aspects or embodiments described above and herein, the hybrid-electric aircraft propulsion system may further include a nacelle circumscribing and housing the engine, and the at least one control unit may be disposed at the nacelle.

In any of the aspects or embodiments described above and herein, the first tubular conduit body may extend along the second tubular conduit body from the nacelle to the engine static structure.

In any of the aspects or embodiments described above and herein, the first tubular conduit body may include a first conduit material, the second tubular conduit body may include a second conduit material, and the first conduit material may be different than the second conduit material.

In any of the aspects or embodiments described above and herein, the at least one control unit may include a first control unit and a second control unit, the first electrical cables may electrically interconnect the first control unit and the first electric machine, and the second electrical cables may electrically interconnect the second control unit and the second electric machine.

According to another aspect of the present disclosure, a hybrid-electric aircraft propulsion system includes an engine, a first electric machine assembly, and a second electric machine assembly. The engine includes a first rotational assembly and a second rotational assembly. Each of the first rotational assembly and the second rotational assembly include a shaft, a bladed compressor rotor, and a bladed turbine rotor. The shaft interconnects the bladed compressor rotor and the bladed turbine rotor. The first electric machine assembly includes a first electric machine, a first control unit, first electrical cables, and a first cable conduit. The first electric machine is coupled with the first rotational assembly. The first electrical cables extending between and electrically connect the first electric machine and the first control unit. The first electrical cables extend through the first cable conduit between the first electric machine and the first control unit. The first cable conduit includes a first conduit material. The second electric machine assembly includes a second electric machine, a second control unit, second electrical cables, and a second cable conduit. The second electric machine is coupled with the second rotational assembly. The second electrical cables extend between and electrically connect the second electric machine and the second control unit. The second electrical cables extend through the second cable conduit between the second electric machine and the second control unit. The second cable conduit include a second conduit material different than the first conduit material.

In any of the aspects or embodiments described above and herein, the engine may further include an engine static structure housing the first rotational assembly and the second rotational assembly, the first electric machine and the second electric machine may be disposed within the engine static structure, and the first control unit and the second control unit may be disposed outside the engine static structure.

In any of the aspects or embodiments described above and herein, the hybrid-electric aircraft propulsion system may further include a nacelle circumscribing and housing the engine, and the first control unit and the second control unit may be disposed at the nacelle.

In any of the aspects or embodiments described above and herein, the first cable conduit may extend between and to the first electric machine and the first control unit and the second cable conduit may extend between and to the second electric machine and the second control unit.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood; however, the following description and drawings are intended to be exemplary in nature and non-limiting.

DETAILED DESCRIPTION

Figure 1:
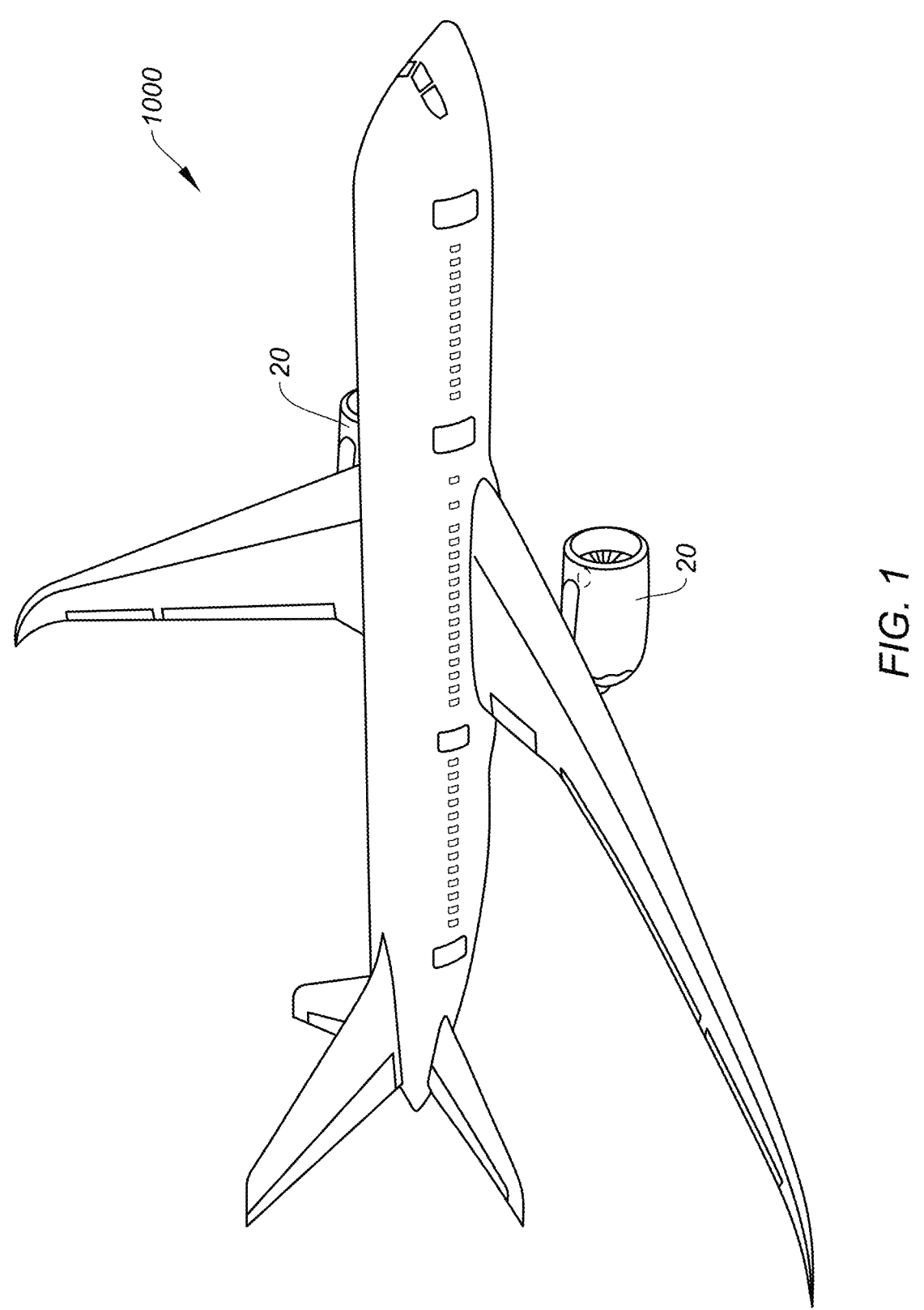
FIG. 1 illustrates a perspective view of an aircraft including a propulsion system, in accordance with one or more embodiments of the present disclosure.
Figure 2:
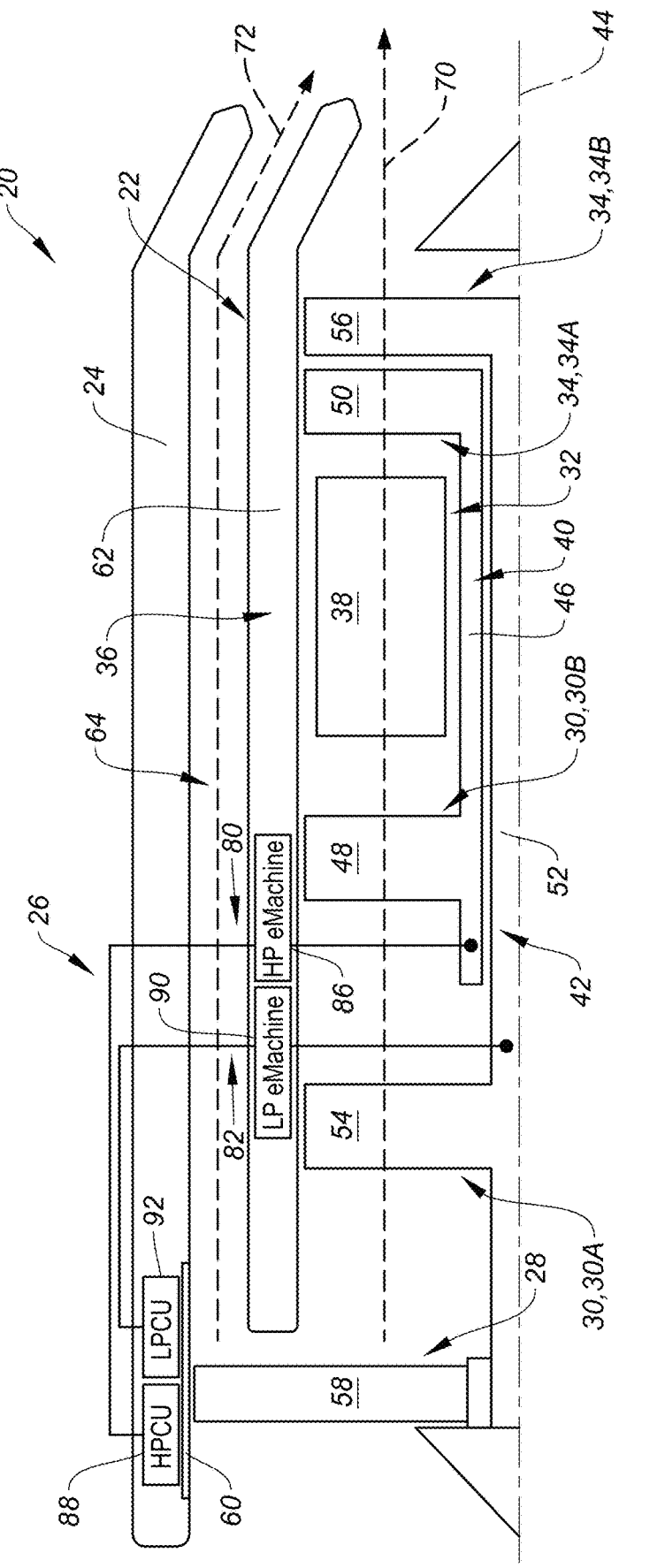
FIG. 2 schematically illustrates a cutaway, side view of a hybrid-electric propulsion system for an aircraft, in accordance with one or more embodiments of the present disclosure.

FIG. 1 illustrates a propulsion system 20 for an aircraft 1000. FIG. 2 schematically illustrates a cutaway, side view of the propulsion system 20. The propulsion system 20 of FIG. 2 is configured as a hybrid-electric propulsion system. The propulsion system 20 includes a gas turbine engine 22, a nacelle 24, and an electrical assembly 26.

The gas turbine engine 22 of FIG. 2 is configured as a multi-spool turbofan gas turbine engine. However, while the following description and accompanying drawings may refer to the turbofan gas turbine engine of FIG. 2 as an example, it should be understood that aspects of the present disclosure may be equally applicable to other types of gas turbine engines including, but not limited to, a turboshaft gas turbine engine, a turboprop gas turbine engine, a turbojet gas turbine engine, and/or a propfan (e.g., an open rotor) gas turbine engine.

The gas turbine engine 22 of FIG. 2 includes a fan section 28, a compressor section 30, a combustor section 32, a turbine section 34, and an engine static structure 36. The compressor section 30 includes a low-pressure compressor (LPC) 30A and a high-pressure compressor (HPC) 30B. The combustor section 32 includes a combustor 38 (e.g., an annular combustor). The turbine section 34 includes a high-pressure turbine (HPT) 34A and a low-pressure turbine (LPT) 34B. The compressor section 30, the combustor section 32, and the turbine section 34 may collectively be referred to as an "engine core."

Components of the fan section 28, the compressor section 30, and the turbine section 34 form a first rotational assembly 40 (e.g., a high-pressure (HP) spool) and a second rotational assembly 42 (e.g., a low-pressure (LP) spool) of the gas turbine engine 22. The first rotational assembly 40 and the second rotational assembly 42 are mounted for rotation about a rotational axis 44 (e.g., an axial centerline) of the gas turbine engine 22 relative to the engine static structure 36.

The first rotational assembly 40 includes a first shaft 46, a bladed first compressor rotor 48 for the high-pressure compressor 30B, and a bladed first turbine rotor 50 for the high-pressure turbine 34A. The first shaft 46 interconnects the bladed first compressor rotor 48 and the bladed first turbine rotor 50.

The second rotational assembly 42 includes a second shaft 52, a bladed second compressor rotor 54 for the low-pressure compressor 30A, a bladed second turbine rotor 56 for the low-pressure turbine 34B, and a bladed fan rotor 58 for the fan section 28. The second shaft 52 interconnects the bladed second compressor rotor 54 and the bladed second turbine rotor 56. The second shaft 52 may additionally interconnect the bladed fan rotor 58 with the bladed second compressor rotor 54 and the bladed second turbine rotor 56. Alternatively, the second shaft 52 may be coupled with the bladed fan rotor 58 by a gear train (e.g., a reduction gear assembly, an epicyclic gear assembly, a transmission, etc.), which may enable the bladed fan rotor 58 to operate at a different (e.g., slower) rotational speed than the bladed second compressor rotor 54, the bladed second turbine rotor 56, and the second shaft 52. The first shaft 46 and the second shaft 52 are concentric and configured to rotate about the rotational axis 44. The present disclosure, however, is not limited to concentric configurations of the first shaft 46 and the second shaft 52.

The engine static structure 36 may include one or more engine cases, cowlings, bearing assemblies, and/or other non-rotating structures configured to house and/or support (e.g., rotationally support) components of the gas turbine engine 22 sections 28, 30, 32, 34. The engine static structure 36 of FIG. 2 includes a fan case 60 and an inner fixed structure 62. The fan case 60 extends circumferentially about (e.g., completely around) the rotational axis 44 within the fan section 28. The fan case 60 is disposed radially outward of and circumscribes the bladed fan rotor 58. The inner fixed structure 62 extends circumferentially about (e.g., completely around) the rotational axis 44. The inner fixed structure 62 houses and circumscribes the compressor section 30, the combustor section 32, and the turbine section 34 (e.g., the engine core). The inner fixed structure 62 may form an exterior (e.g., an outer radial portion) of the gas turbine engine 22. The fan case 60 and the inner fixed structure 62 form portions of an annular bypass duct 64 of the propulsion system 20. The bypass duct 64 extends axially through the propulsion system 20.

The nacelle 24 forms an aerodynamic exterior of the propulsion system 20 and a housing for the gas turbine engine 22. The nacelle 24 extends circumferentially about (e.g., completely around) the rotational axis 44. The nacelle 24 extends axially along the rotational axis 44 circumscribing the gas turbine engine 22. The nacelle 24 is disposed at (e.g., on, adjacent, or proximate) and encloses the fan case 60. The nacelle 24 further forms the bypass duct 64 (e.g., an outer radial boundary of the bypass duct 64) through the propulsion system 20.

As will be discussed in further detail, the electrical assembly 26 of FIG. 2 includes a first electric machine assembly 80 (e.g., an "HP" electric machine assembly) and a second electric machine assembly 82 (e.g., an "LP" electric machine assembly). The first electric machine assembly 80 includes a first electric machine 86 (e.g., an "HP eMachine") and a first control unit 88 ("HPCU"; e.g., a motor control unit, a generator control unit, etc.). The first electric machine 86 is coupled with the first rotational assembly 40 (e.g., the first shaft 46), for example, directly or indirectly through a gear train (e.g., a gear box, a bevel gear assembly, etc.). The first control unit 88 is electrically connected to the first electric machine 86. The second electric machine assembly 82 includes a second electric machine 90 (e.g., an "LP eMachine") and a second control unit 92 ("LPCU"; e.g., a motor control unit, a generator control unit, etc.). The second electric machine 90 is coupled with the second rotational assembly 42 (e.g., the second shaft 52), for example, directly or indirectly through a gear train (e.g., a gear box, a bevel gear assembly, etc.). The second control unit 92 is electrically connected to the second electric machine 90.

Each of the electric machines 86, 90 may be configurable as an electric motor and/or an electric generator (e.g., an electric motor-generator). For example, during a motor mode of operation, the electric machines 86, 90 may operate as the electric motor to convert electricity received from the respective one of the control units 88, 92. By contrast, during a generator mode of operation, the electric machines 86, 90 may operate as the electric generator to convert mechanical power received from the respective one of the rotational assemblies 40, 42 into electricity. The electric machines 86, 90 of the present disclosure, however, are not limited to such exemplary operation. For example, one or both of the electric machines 86, 90 may alternatively each be configured as a dedicated electric generator (e.g., without the electric motor functionality) or as a dedicated electric motor (e.g., without the electric generator functionality).

Each of the control units 88, 92 is configured to control operation of the respective one of the electric machines 86, 92. For example, when operating as the electric motor, the respective control unit 88, 92 is configured to regulate a flow of electricity from an aircraft electrical system to the respective electric machine 86, 90. This electricity flow regulation may include: (a) turning-on the flow of electricity from the aircraft electrical system to the respective electric machine 86, 90 (e.g., electrically coupling the respective electric machine 86, 90 to the aircraft electrical system); (b) turning-off the flow of electricity from the aircraft electrical system to the respective electric machine 86, 90 (e.g., electrically decoupling the respective electric machine 86, 90 from the aircraft electrical system); (c) moderating the flow of electricity from the aircraft electrical system to the respective electric machine 86, 90 (e.g., to control a rotation speed and/or torque of the respective electric machine 86, 90). Here, the respective control unit 88, 92 operates as a motor controller. In another example, when operating as the electric generator, the respective control unit 88, 92 is configured to regulate a flow of electricity from the respective electric machine 86, 90 to the aircraft electrical system. This electricity flow regulation may include: (a) turning-on the flow of electricity from the respective electric machine 86, 90 to the aircraft electrical system (e.g., electrically coupling the respective electric machine 86, 90 to the aircraft electrical system); (b) turning-off the flow of electricity from the respective electric machine 86, 90 to the aircraft electrical system (e.g., electrically decoupling the respective electric machine 86, 90 from the aircraft electrical system); (c) moderating the flow of electricity from the respective electric machine 86, 90 to the aircraft electrical system. Here, the respective control unit 88, 92 operates as a generator controller.

In some embodiments, the first electric machine 86 and the second electric machine 90 may be electrically connected with a single control unit configured to configured to control operation of each of the first electric machine 86 and the second electric machine 88, similar to the operation of the first control unit 88 and the second control unit 92.

The control units 88, 92 may be connected in signal communication with and controlled by an electronic engine control (EEC) unit, a full authority digital engine control (FADEC) unit, or another control unit of the propulsion system 20 or its gas turbine engine 22. The electric machines 86, 88 and the control units 90, 92 may typically be located in different portions of the propulsion system 20. For example, the electric machines 86, 88 may be disposed within the engine static structure 36 at (e.g., on, adjacent, or proximate) the rotational assemblies 40, 42 and/or a gear train (e.g., an accessory gearbox) coupled with the rotational assemblies 40, 42. In contrast, the control units 90, 92 may be disposed outside of the engine static structure 36, for example, on the fan case 60 and/or within the nacelle 24.

In operation of the gas turbine engine 22 of FIG. 2, ambient air is directed through the fan section 28 and into a core flow path 70 (e.g., an annular flow path) and a bypass flow path 72 (e.g., an annular flow path) by rotation of the bladed fan rotor 58. Air flow along the core flow path 70 is compressed by the low-pressure compressor 30A and the high-pressure compressor 30B, mixed and burned with fuel in the combustor 38, and then directed through the high-pressure turbine 34A and the low-pressure turbine 34B. The bladed first turbine rotor 50 and the bladed second turbine rotor 56 rotationally drive the first rotational assembly 40 and the second rotational assembly 42, respectively, in response to the combustion gas flow through the high-pressure turbine 34A and the low-pressure turbine 34B. Air flow along the bypass flow path 72 is directed through the bypass duct 64. The first electric machine 86 and the second electric machine 90 may be selectively operated to apply rotational force to the first rotational assembly 40 and/or the second rotational assembly 42, respectively. The first electric machine 86 and/or the second electric machine 90 may alternatively be driven by the first rotational assembly 40 and/or the second rotational assembly 42, respectively to generate electrical power for the electrical assembly 26 (e.g., an electrical distribution system of the aircraft 1000 and/or the propulsion system 20).

For hybrid-electric aircraft propulsion systems including multiple propulsion train electric machine assemblies, electrical connections between machine control units and respective electric machines of each of the electric machine assemblies may conventionally be made by high-voltage electrical cables routed through a shared conduit. In other words, electrical cables for each of the electric machine assemblies may be routed together through this shared conduit along at least a portion of their length. However, this configuration of the electrical cables and associated conduit presents a risk of loss of both (or more than two) electric machine assemblies in the event of an arc (e.g., between electrical cables or between an electrical cable and the conduit), electrical fire, or another electrical fault within the shared conduit. Moreover, the different electric machine assemblies may exhibit with different noise frequencies during operation, and these different noise frequencies may interfere with one another at the common conduit.

Figure 3:
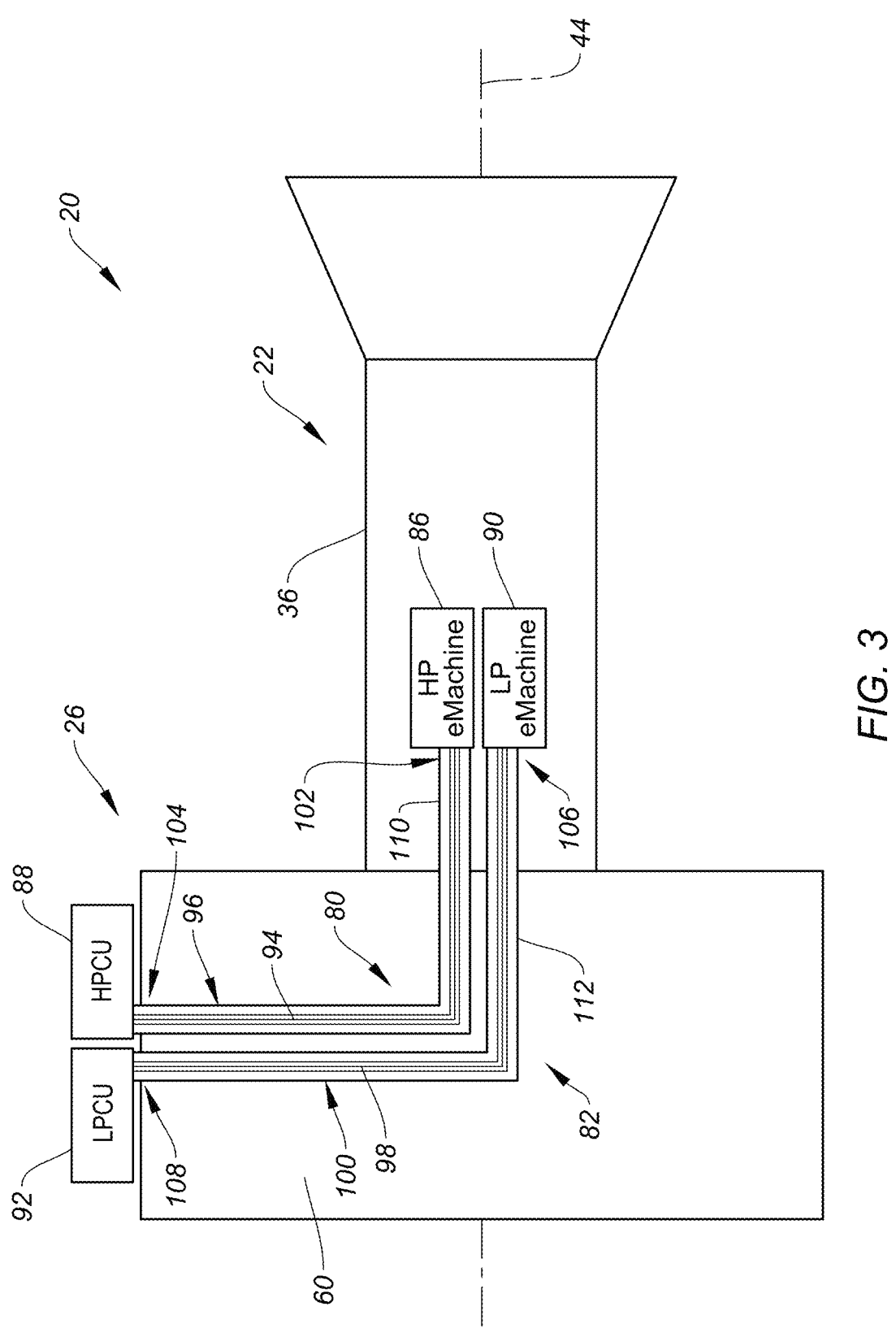
FIG. 3 schematically illustrates an electrical assembly of the hybrid-electric propulsion system including a first electric machine assembly and a second electric machine assembly, in accordance with one or more embodiments of the present disclosure.

Referring to FIG. 3, the first electric machine assembly 80 and the second electric machine assembly 82 are schematically illustrated in greater detail. The first electric machine assembly 80 includes first electrical cables 94 and a first cable conduit 96. Similarly, the second electric machine assembly 82 includes second electrical cables 98 and a second cable conduit 100.

The first electrical cables 94 extend between and to, and electrically interconnect, the first electric machine 86 and the first control unit 88. The first electrical cables 94 may include a single electrical cable or a plurality of electrical cables (e.g., three-phase AC electrical cables). The first cable conduit 96 may include a tubular conduit body 110. The first electrical cables 94 extend through the first cable conduit 96 (e.g., the tubular conduit body 110) along all or a substantial portion of their length between the first electric machine 86 and the first control unit 88. The first cable conduit 96 may similarly extend between and to, or substantially between and to, the first electric machine 86 and the first control unit 88 circumscribing and housing the first electrical cables 94. For example, the first cable conduit 96 may extend from a first end 102 of the first cable conduit 96 at (e.g., on, adjacent, or proximate) the first electric machine 86 (e.g., within the engine static structure 36) to a second end 104 of the first cable conduit 96 at (e.g., on, adjacent, or proximate) the first control unit 88 (e.g., on the fan case 60).

The second electrical cables 98 extend between and to, and electrically interconnect, the second electric machine 90 and the second control unit 92. The second electrical cables

98 may include a single electrical cable or a plurality of electrical cables (e.g., three-phase AC electrical cables). The second cable conduit 100 may include a tubular conduit body 112. The second electrical cables 98 extend through the second cable conduit 100 (e.g., the tubular conduit body 112) along all or a substantial portion of their length between the second electric machine 90 and the second control unit 92. The second cable conduit 100 may similarly extend between and to, or substantially between and to, the second electric machine 90 and the second control unit 92 circumscribing and housing the second electrical cables 98. For example, the second cable conduit 100 may extend from a first end 106 of the second cable conduit 100 at (e.g., on, adjacent, or proximate) the second electric machine 90 (e.g., within the engine static structure 36) to a second end 108 of the second cable conduit 100 at (e.g., on, adjacent, or proximate) the second control unit 92 (e.g., on the fan case 60). The second cable conduit 100 may extend along and/or contact the first cable conduit 96.

The configuration of the cables 94, 96 and different respective cable conduits 98, 100 facilitates improved reliability of the electric machine assemblies 80, 82. For example, in the event of an electrical fault within the cable conduit 98, 100 (e.g., a cable to conduit arc) of one of the electric machine assemblies 80, 82, the other electric machine assembly 80, 82 may be unaffected and remain operational. The configuration of the cables 94, 96 and different respective cable conduits 98, 100 may additionally facilitate improved maintainability of the electric machine assemblies 80, 82. For example, maintenance, repair, installation, or removal of one of the electric machine assemblies 80, 82 may not require handling of the cables 94, 96 and cable conduit 98, 100 of the other electric machine assembly 80, 82. In other words, components of the first electric machine assembly 80 may be removed and replaced without impacting components of the second electric machine assembly 82, and vice versa.

In some embodiments, the first cable conduit 96 and the second cable conduit 100 may be configured to facilitate vibrational damping for the first electric machine assembly 80 and the second electric machine assembly 82 which, as previously discussed, may exhibit different vibrational frequencies and/or characteristics during operation. For example, the first cable conduit 96 (e.g., the tubular conduit body 110) may be formed by a first conduit material (e.g., a metal or metal alloy material, a plastic material, etc.), the second cable conduit 96 (e.g., the tubular conduit body 112) may be formed by a second conduit material (e.g., a metal or metal alloy material such as a high-permeability powder metal, a plastic material, etc.), and the first conduit material may be different than the second conduit material. The first conduit material and the second conduit material may have different mechanical properties such as, but not limited to, stiffness, damping, density, and the like, which different mechanical properties may influence the natural frequencies, mode shapes, and vibrational responses of the first cable conduit 96 and the second cable conduit 100, respectively. These different conduit materials may be selected to facilitate attenuation of noise, including electrical pulse width modulation (PWM) noise, from the electric machines 86, 90, the control units 88, 92, and the cables 94, 96. Additionally or alternatively, the first cable conduit 96 and the second cable conduit 100 may include different mounting configurations and/or vibration damping components configured to facilitate damping of different vibration frequency ranges. The separate cable conduit 98, 100 configurations for the first electric machine assembly 80 and the second electric machine assembly 82 may prevent or reduce the severity of vibrational interference between the first electric machine assembly 80 and the second electric machine assembly 82 during operation. Moreover, separate cable conduit 98, 100 configurations for the first electric machine assembly 80 and the second electric machine assembly 82 facilitate the use of different conduit materials, mounting configurations, and damping components for the different cable conduits 98, 100, thereby preventing or reducing the severity of vibrational modes of the cable conduits 98, 100 which may otherwise contribute to mechanical failure and/or increased propulsion system 20 noise.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A hybrid-electric aircraft propulsion system comprising:
   an engine comprising a first rotational assembly and a second rotational assembly;
   a first electric machine assembly comprising a first electric machine, a first control unit, first electrical cables, and a first cable conduit, the first electric machine coupled with the first rotational assembly, the first electrical cables extending between and electrically connecting the first electric machine and the first control unit, the first electrical cables extending through the first cable conduit between the first electric machine and the first control unit; and
   a second electric machine assembly comprising a second electric machine, a second control unit, second electrical cables, and a second cable conduit, the second electric machine coupled with the second rotational assembly, the second electrical cables extending between and electrically connecting the second electric machine and the second control unit, the second electrical cables extending through the second cable conduit between the second electric machine and the second control unit;
   wherein the first cable conduit comprises a first conduit material, the second cable conduit comprises a second conduit material, and the first conduit material is different than the second conduit material.

2. The hybrid-electric aircraft propulsion system of claim 1, wherein the first cable conduit extends between and to the first electric machine and the first control unit.

3. The hybrid-electric aircraft propulsion system of claim 1, wherein the second cable conduit extends between and to the second electric machine and the second control unit.

4. The hybrid-electric aircraft propulsion system of claim 1, wherein the engine further comprises an engine static structure housing the first rotational assembly and the second rotational assembly, the first electric machine and the second electric machine are disposed within the engine static structure, and the first control unit and the second control unit are disposed outside the engine static structure.

5. The hybrid-electric aircraft propulsion system of claim 4, further comprising a nacelle circumscribing and housing the engine, the first control unit and the second control unit being disposed at the nacelle.

6. The hybrid-electric aircraft propulsion system of claim 5, wherein the first cable conduit extends along the second cable conduit from the nacelle to the engine static structure.

7. The hybrid-electric aircraft propulsion system of claim 1, wherein each of the first rotational assembly and the second rotational assembly comprises a shaft, a bladed compressor rotor, and a bladed turbine rotor, and the shaft interconnects the bladed compressor rotor.

8. A hybrid-electric aircraft propulsion system comprising:

an engine comprising a first rotational assembly and a second rotational assembly; and an electrical assembly comprising a first electric machine, first electrical cables, a first cable conduit, a second electric machine, second electrical cables, a second cable conduit, and at least one control unit, the first electric machine coupled with the first rotational assembly, the first electrical cables extending between and electrically connecting the first electric machine and the at least one control unit, the first cable conduit comprising a first tubular conduit body, the first electrical cables extending through the first tubular conduit body between the first electric machine and the at least one control unit, and the second electric machine coupled with the second rotational assembly, the second electrical cables extending between and electrically connecting the second electric machine and the at least one control unit, the second cable conduit comprising a second tubular conduit body, the second electrical cables extending through the second tubular conduit body between the second electric machine and the at least one control unit;

wherein the first tubular conduit body comprises a first conduit material, the second tubular conduit body comprises a second conduit material, and the first conduit material is different than the second conduit material.

9. The hybrid-electric aircraft propulsion system of claim 8, wherein the first tubular conduit body extends between and to the first electric machine and the at least one control unit.

10. The hybrid-electric aircraft propulsion system of claim 8, wherein the second tubular conduit body extends between and to the second electric machine and the at least one control unit.

11. The hybrid-electric aircraft propulsion system of claim 8, wherein the engine further comprises an engine static structure housing the first rotational assembly and the second rotational assembly, the first electric machine and the second electric machine are disposed within the engine static structure, and the at least one control unit is disposed outside the engine static structure.

12. The hybrid-electric aircraft propulsion system of claim 11, further comprising a nacelle circumscribing and housing the engine, the at least one control unit being disposed at the nacelle.

13. The hybrid-electric aircraft propulsion system of claim 12, wherein the first tubular conduit body extends along the second tubular conduit body from the nacelle to the engine static structure.

14. The hybrid-electric aircraft propulsion system of claim 8, wherein the at least one control unit comprises a first control unit and a second control unit, the first electrical cables electrically interconnect the first control unit and the first electric machine, and the second electrical cables electrically interconnect the second control unit and the second electric machine.

15. A hybrid-electric aircraft propulsion system comprising:

an engine comprising a first rotational assembly and a second rotational assembly, each of the first rotational assembly and the second rotational assembly comprising a shaft, a bladed compressor rotor, and a bladed turbine rotor, the shaft interconnecting the bladed compressor rotor and the bladed turbine rotor;

a first electric machine assembly comprising a first electric machine, a first control unit, first electrical cables, and a first cable conduit, the first electric machine coupled with the first rotational assembly, the first electrical cables extending between and electrically connecting the first electric machine and the first control unit, the first electrical cables extending through the first cable conduit between the first electric machine and the first control unit, the first cable conduit comprising a first conduit material; and a second electric machine assembly comprising a second electric machine, a second control unit, second electrical cables, and a second cable conduit, the second electric machine coupled with the second rotational assembly, the second electrical cables extending between and electrically connecting the second electric machine and the second control unit, the second electrical cables extending through the second cable conduit between the second electric machine and the second control unit, the second cable conduit comprising a second conduit material different than the first conduit material.

16. The hybrid-electric aircraft propulsion system of claim 15, wherein the engine further comprises an engine static structure housing the first rotational assembly and the second rotational assembly, the first electric machine and the second electric machine are disposed within the engine static structure, and the first control unit and the second control unit are disposed outside the engine static structure.

17. The hybrid-electric aircraft propulsion system of claim 16, further comprising a nacelle circumscribing and housing the engine, the first control unit and the second control unit disposed at the nacelle.

18. The hybrid-electric aircraft propulsion system of claim 15, wherein the first cable conduit extends between and to the first electric machine and the first control unit and the second cable conduit extends between and to the second electric machine and the second control unit.

* * * * *